April 22, 1952 P. S. DICKEY 2,593,661
BOILER EFFICIENCY INSTRUMENT
Filed Jan. 19, 1948 2 SHEETS—SHEET 1
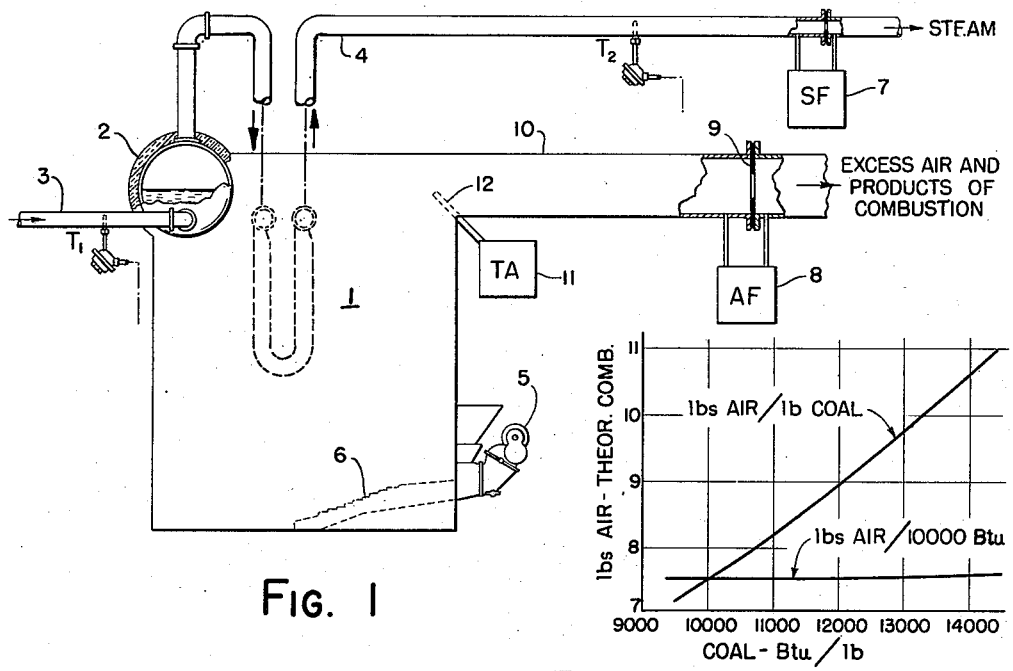
Fig. 1
Fig. 4
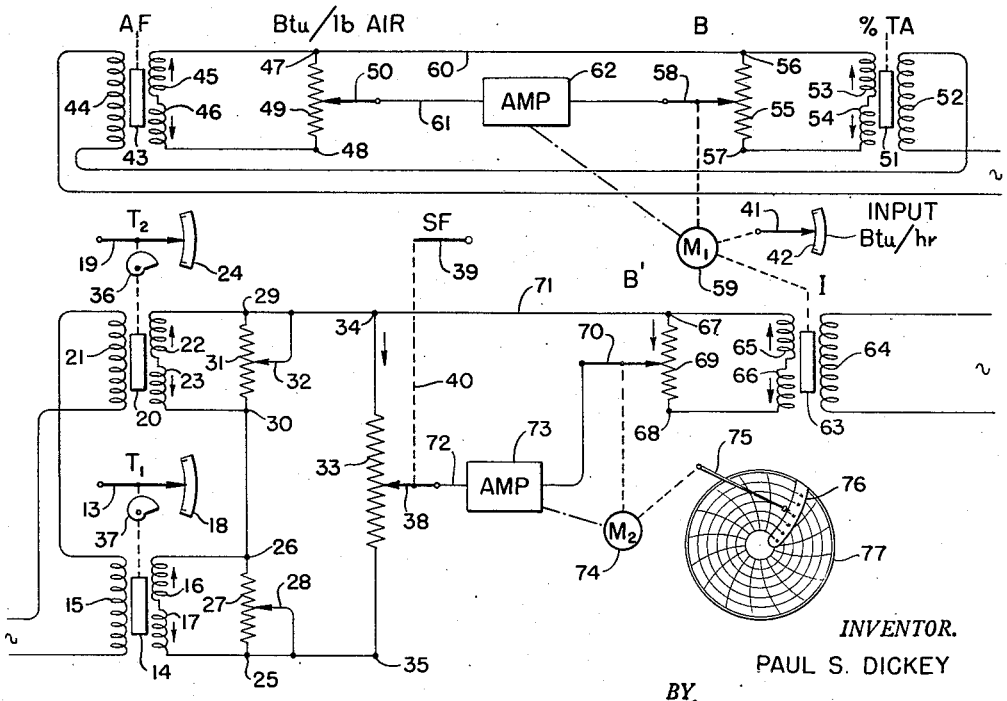
Fig. 2
INVENTOR.
PAUL S. DICKEY
BY
Raymond W. Jenkins
ATTORNEY

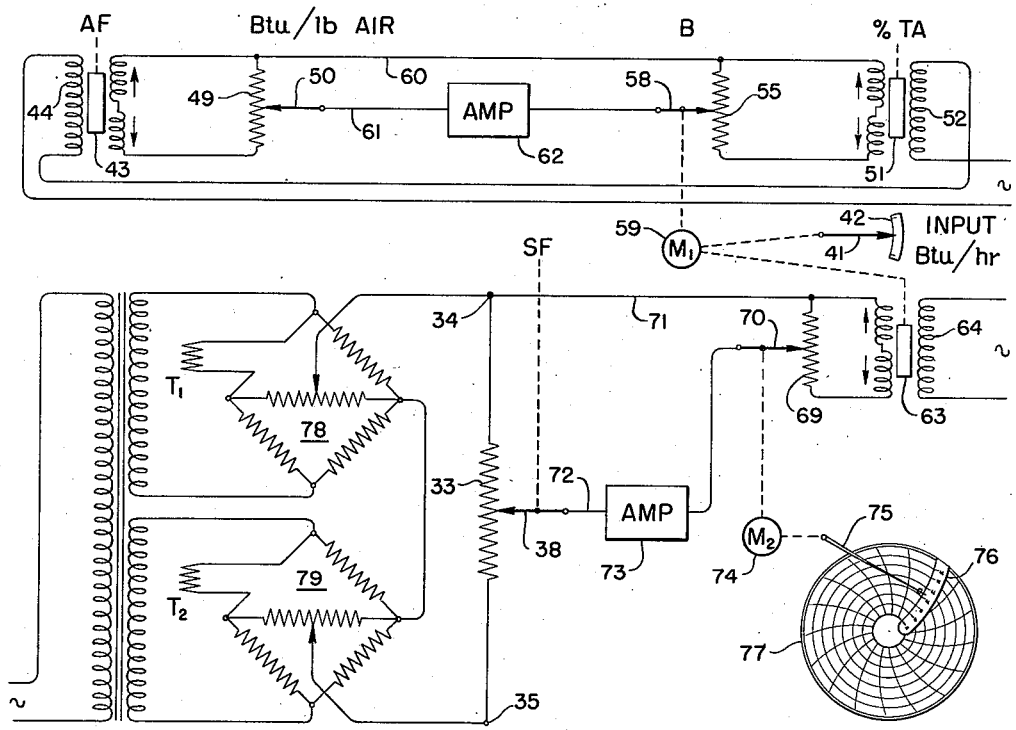
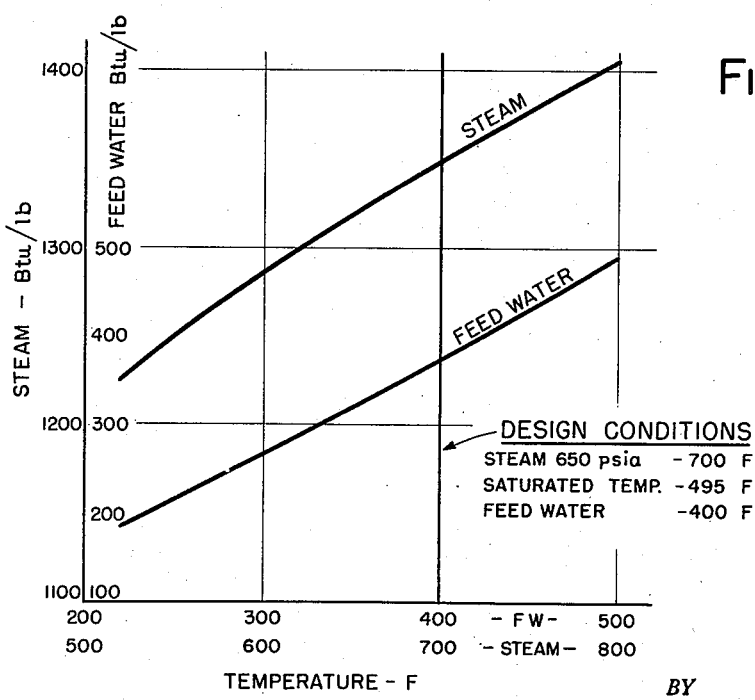
Fig. 3
Fig. 5

Patented Apr. 22, 1952

2,593,661

UNITED STATES PATENT OFFICE 2,593,661

BOILER EFFICIENCY INSTRUMENT

Paul S. Dickey, East Cleveland, Ohio, assignor to Bailey Meter Company, a corporation of Delaware Application January 19, 1948, Serial No. 3,150

9 Claims. (Cl. 73—112)

This invention relates to the art of power plant instruments and is particularly directed to providing instruments for measuring and visually exhibiting variables in the operation of power producing or utilizing apparatus. The manifestation may be in terms of value of the variables or of some function of the variable or may be a result of interrelation or comparison of two or more variables where such comparison results in the attainment of a desirable index as to the operating condition or efficiency of the power producing or utilizing apparatus.

My invention is particularly directed to providing an improved efficiency meter for use with vapor generators or boilers as they are often called.

One object of my invention is to provide an operating guide continually visually advising the operator as to the operating condition of the boiler and at the same time making a permanent record thereof.

Another object of the invention is to provide an efficiency meter for a boiler.

A further object is to provide a measuring instrumentality continuously interrelating heat input to a boiler with heat output therefrom in terms of overall thermal efficiency of the unit.

Another object is to provide an efficiency meter for a boiler burning solid fuel such as coal on a grate wherein it is not necessary to actually measure the rate of supply of coal.

Other objects will become apparent from a study of the specification and drawings describing my invention and from the claims.

In the drawings:

Fig. 1 is a diagrammatic representation of a vapor generator to which my invention may be applied.

Fig. 2 is a schematic showing of an electrical calculating network illustrating a preferred embodiment of my invention.

Fig. 3 is a schematic diagram embodying a second form of my invention.

Figs. 4 and 5 are graphs of conditions pertinent to the operation of the vapor generator shown in Fig. 1.

Referring now to Fig. 1 I show therein in somewhat diagrammatic fashion a vapor generator 1 having a separation drum 2 to which feed water is supplied through a conduit 3 and from which steam discharges through a superheater and main conduit 4 to any point of usage. Fuel for combustion is supplied to the furnace 1 through the agency of a stoker 5 and is burned on the grates 6. In the present illustrative embodiment I have chosen to apply my invention to a vapor generator whose furnace utilizes the combustion of a solid fuel such as coal burned upon the grates.

To ascertain the B. t. u. output of the unit, it is necessary to determine the difference between the heat contained in the feed water supply and the heat contained in the steam discharged through the conduit 4. Inasmuch as the same weight rate of steam leaves the boiler as enters in the form of feed water during normal operation, it is only necessary to measure one or the other. Preferably I measure the steam flow by means of a rate meter 7 connected to the conduit 4 as a measure of load or total output and multiply this rate by the difference in B. t. u. content of the feed water and of the steam. I have found that I may use the temperature of the feed water and the temperature of the outgoing steam as measurable functions of the heat content of the water and steam. I thus provide in connection with the conduit 3 a temperature measuring element $T_1$ and in connection with the conduit 4 a temperature measuring element $T_2$.

Reference should now be made to Fig. 5 wherein I have shown in graphic form the relation between temperature and heat content for both feed water and steam under different conditions. As a premise I have chosen to consider that the power producing unit of Fig. 1 receives feed water at above 650 p. s. i. a. and at a temperature of 400° F, while the steam discharged through the conduit 4 is at a design condition of 650 p. s. i. a. and 700° F with a saturation temperature of 495° F. From the steam tables it is seen that each pound of the feed water under these conditions has a heat value of 375 B. t. u. while each pound of steam under design conditions has a heat value of 1348 B. t. u. This is clearly shown in Fig. 5 and through the design conditions I have drawn a reference line vertically on the graph.

I furthermore assume that the pressure of the feed water supply and the pressure of the steam discharged remain substantially invariable although the effect of pressure variation upon heat content of either the water or the steam is substantially negligible. In fact a variation in steam pressure of ±100 p. s. i., at a constant temperature of 700° F, results in a heat content variation of not over ½% from the design condition value. I have therefore, in the present example, chosen to assume that expected operating deviations in pressure of the feed water or of the steam from design value will be of a minor nature and will not introduce any significant error into the calculation or the resulting answer provided as an operating guide.

An examination of the graphs on Fig. 5 will show that the plot of feed water is slightly concave downward while the plot of steam is slightly convex upward thus indicating a slight departure from true linearity in functional relation between temperature and heat content of each. At the same time it will be noted that for any reasonable expectancy of departure in one direction or the other from design conditions that the relations are to all intents and purposes substantially linear and that therefore I may usually disregard this non-linearity in functional relationship.

Desirably I compare the heat output of the unit with the heat input to the unit to obtain a measure of overall efficiency. I have briefly mentioned certain considerations in connection with a continuous determination of the heat output of the boiler. Physical difficulties exist in the continuous determination of heat input to the boiler when the fuel supplied for combustion is solid fuel, such as coal for example, being fed to a stoker or similar feeding and burning device. The coal itself will vary as to size, moisture content, chemical composition and heat value and the feed to the grate may be discontinuous in nature. Even after the coal is supplied to the grate the rate of combustion of the coal may vary from minute to minute depending upon many operating conditions. With such a fuel it is therefore extremely difficult to provide a continuous manifestation of rate of supply of B. t. u. or rather of liberation of B. t. u. from which the steam is to be produced.

In accordance with my invention it is not necessary to actually measure the rate of supply of coal to the grate or the rate of liberation of heat from the coal within the furnace. I provide means for inferentially continuously obtaining this information within reasonable limits of accuracy and useful as a continuous operating guide.

This portion of my invention is predicated upon an appreciation of the fact that air is a fuel just as much as coal. Reference to Fig. 4 reveals that a linear relation exists between the heating value of coals in B. t. u. per pound and the pounds of air required for theoretical combustion of the coal. This relation holds true throughout the range of commercial coal. Fig. 4 also clearly illustrates that a substantially constant value of 7.5 pounds of air is required for the release of each 10,000 B. t. u. under theoretical combustion conditions regardless of the type or nature of the coal being burned. Thus, to ascertain the rate of heat input to the furnace 1 in terms of B. t. u. per hour under theoretical combustion conditions, it is only necessary to obtain a measure of air flow through the unit in pounds per hour and multiply this by the B. t. u. release per pound of air divided by the per cent total air actually existing through the unit in terms of percentage of theoretical air required for perfect combustion. This operation may be expressed as follows:

$$\text{Heat input in B.t.u./hr. under theor. comb. conditions} = \text{measured air lb./hr.} \times \frac{10{,}000}{\text{lb. air per 10{,}000 B.t.u.}}$$

$$= AF \times 1333$$

while $$\text{Under actual conditions B.t.u./hr.} = 1333\, AF \times \frac{1}{\left(\text{ratio of }\frac{\text{actual air}}{\text{theor. air}}\right)}$$

$$= \frac{1333\, AF}{\text{per cent total air}}$$

If conditions of theoretical combustion obtain then per cent total air would be 1.00. From the above the heat release under such theoretical combustion conditions will be 1333×the measured air flow in pounds per hour with the result expressed in B. t. u. per hour. If twice as much air is being supplied with the fuel for combustion as is theoretically required, then the (per cent total air) =2.00 and under such actual combustion conditions the total heat input in B. t. u. per hour will equal 1333×the measured pounds of air passing through the unit per hour divided by 2. Thus it will be seen that I may obtain a continuous representation of the B. t. u. per hour heat input or heat release within the furnace by ascertaining a measurement of the weight rate of air flow through the unit and a measurement of the per cent total air in comparison with the theoretical air required.

To obtain a measure of the air flow passing through the unit in pounds per hour I provide a rate flow meter 8 designated (AF) and sensitive to pressure differentials existing across an orifice 9 positioned in the output duct 10 for the products of combustion leaving the unit. The rate meter 8 need not be connected across an orifice 9 but in many instances may be connected to be responsive to the pressure differential existing between two passes of the boiler or across an air heater or other fixed restriction in the path of the excess air and products of combustion flowing through the unit. It is only important that the meter 8 provide a continuous measure of total air passing through the unit in pounds per hour and such meters are well known in the art. By "air flow" I intend to include the rate of flow of gaseous products of combustion and excess air passing through the generating unit i. e. the assembly of vapor generator, superheaters, etc. As is well known to those familiar with the art, air flow has long been utilized as an indication of firing rate or heat liberation and thereby an indication of heat available for vaporizing the liquid and superheating the vapor. On the other hand the rate of flow of steam produced under constant conditions of temperature and pressure is a measure of heat absorption.

To obtain a continuous representation of total air (TA) in terms of ratio of actual air flow to theoretical air flow I provide the TA meter 11 diagrammatically shown as having a sample tube 12 located at the point of discharge of air flow from the boiler 1 to the duct 10. Such a meter is preferably of a type continuously analyzing the gases to ascertain the percentage therein of free oxygen and/or of unburned combustibles and providing an indication in terms of excess air over that theoretically required for perfect combustion or preferably in per cent total air which is the ratio between the actual air and the theoretical air required for perfect combustion. Inasmuch as such measuring instrumentalities are well known it appears unnecessary to go into detail of construction or operation of the instrument 11.

I will now refer particularly to Fig. 2 wherein I have schematically illustrated the calculating network for obtaining continuously an answer of B. t. u. output divided by B. t. u. input in terms of overall boiler efficiency. It will be understood that the designations applied to Fig. 2 of $T_1$, $T_2$, SF, TA, and AF apply respectively to the continuous measurement of temperature of the feed water, temperature of the steam, rate of flow of the steam, per cent total air, and rate of air flow respectively of Fig. 1. These are the variables which, as previously pointed out, I desire to incorporate in my calculating network to arrive at an answer useful in guiding the operation of the unit.

The feed water temperature measuring element $T_1$ is arranged to position an arm 13 which in turn vertically positions a movable core piece 14 relative to a continuously energized primary winding 15 and to a pair of bucking secondary windings 16, 17 connected in series. The arm 13 may indicate relative to an index 18 the actual value of feed water temperature.

In similar fashion the steam temperature measuring device $T_2$ is arranged to position an arm 19 which in turn vertically positions a movable core member 20 of an adjustable transformer having a continuously energized primary 21 and a pair of bucking secondary windings 22, 23 connected in series. The arm 19 may advise the actual temperature of the steam upon an index 24.

Across the terminals 25, 26 of the secondary windings 16, 17 is a resistance 27 contacted by a manually adjustable contact arm 28 thus providing a selectivity as to a portion of the resistance 27 which is to be included between the terminals 25, 26. In similar manner a contact 32 engages the resistance 31 to select that portion of the latter which is desirably to be in circuit between the terminals 29, 30. The terminals 26, 30 are connected by a conductor while the terminals 25, 29 are bridged by a resistance 33.

The various electric elements mentioned comprise a subtraction circuit whereby a voltage across the terminals 34, 35 is representative of $T_2 - T_1$ in terms of B. t. u. content of the steam and of the feed water respectively per pound. The necessary mechanical connecting linkage or electric adjustment possibilities provides that the voltage across the terminals 29, 30 is representative of B. t. u. per pound of steam flowing through the conduit 4 while similar adjustability provides that the voltage across the terminals 25, 26 is representative of B. t. u. per pound of feed water entering the boiler through the conduit 3. At 36 I show a cam diagrammatically interposed between the $T_2$ lever arm 19 and the movable core 20 so that while the arm 19 provides a true indication of temperature upon the scale 24 the resultant positioning of the core member 20 takes into account the non-linear functional relationship between temperature and B. t. u. per pound of steam in accordance with the graph of Fig. 5. In similar manner a cam 37 is interposed between the temperature arm 13 and the core piece 14 so that the index 18 reads correctly the temperature of the feed water entering the boiler while the core piece 14 is positioned in accordance with the non-linear functional relation between such temperature and B. t. u. per pound of the feed water in accordance with the graph of Fig. 5.

The voltage drop across the secondary windings 16, 17 varies directly with the positioning of the core member 14, and consequently proportional to changes in the temperature of the feed water corrected for non-linear relationship. The portion of this voltage selected by contact 28 depends upon the manually adjusted position of the contact along the resistance 27 in accordance with the value of B. t. u. per pound of the feed water for a given temperature if the relationship were linear. Thus the combined effect of the cam 37 and of the manually adjusted position of the contact 28 is to convert the temperature value $T_1$ into terms of B. t. u. per pound heat content of the feed water. The value of the voltage drop in the resistance 27 between the terminal 26 and the contact 28 is therefore representative of the heat input to the boiler per pound of feed water per unit time. In similar fashion the value of the voltage drop in the resistance 31 between the contact 32 and the terminal 30 is representative of the heat content of the outgoing steam in B. t. u. per pound per unit time.

The steam flow meter 7 is adapted to position a contact arm 38 along the resistance 33 through the agency of an arm 39 and connecting linkage 40. The value of the voltage drop in the resistance 33, between the terminal 34 and the contact arm 38, is therefore representative of the product of steam flow and B. t. u. equivalent of $T_2 - T_1$ and therefore continuously representative of the useful heat output of the boiler in terms of B. t. u. per hour.

Voltage drop 34—38 represents $$(T_2 - T_1) \times SF$$

where $T_2$ and $T_1$ are in terms of B. t. u./lb.
SF is in terms of lb./hr.

and (34—38) is in terms of B. t. u./hr.

therefore

B t. u. output $= (T_2 - T_1) \times SF$

= voltage drop between 34—38

Referring now to the upper portion of the circuit shown in Fig. 2 it will be seen that I have here represented a calculating network continually advising the rate of heat liberation (input) to the furnace in terms of B. t. u. per hour. This result is shown by an indicator 41 relative to an index 42 which may be graduated to read in terms of B. t. u. input to the boiler per hour. The cooperating elements 41, 42 may be provided with manual adjustments to take into account the calorific value of the coal as ascertained by laboratory analysis to the end that the index 42 may be graduated to read in pounds of coal per hour, rate of burning, or heat release. In other words the arm 41 may comprise an indicator arm or a recording pen and the indication and/or record be made in desirable units of fuel feed, heat release, heat input or the like.

At the left of the upper network of Fig. 2 the designation AF is meant to show that the air flow meter 8 is arranged to vertically position a core member 43 relative to a continuously energized primary winding 44 and to a pair of bucking secondary windings 45, 46 connected in series. The voltage drop across the secondaries 45, 46 varies directly with the positioning of the core member 43 and consequently proportional to changes in measured rate of air flow leaving the unit through the duct 10. Across the terminals 47, 48 of the secondary windings 45, 46 I show a resistance 49 contacted by a manually adjustable contact arm 50 which is so placed as to represent the numerical value 1333 which, in the present example, is representative of B. t. u. per pound of air needed for theoretical combustion. The portion of the voltage drop across the terminals 47, 48 which is selected by the contact 50 represents B. t. u. per pound of air and the value of the voltage drop in the resistance 49 between the terminal 47 and the contact 50 is therefore representative of the product of air flow in pounds per hour and B. t. u. per pound required for theoretical combustion of the solid fuel being burned in the furnace.

Voltage drop 47—50 represents $AF \times 1333$
when AF is in terms of lb./hr.
1333 is theoretical B. t. u. liberated per lb. air
and (47—50) is in terms of B. t. u./hr.

therefore

B. t. u. input if theoretically perfect combustion prevails $= 1333\ AF$
$=$ voltage drop between 47—50

At the right hand end of the upper network I indicate that the total air meter 11 is arranged to vertically position the core 51 of an adjustable core transformer having a continuously energized primary 52 and a pair of bucking secondary windings 53, 54 connected in series. Connected across the secondary windings 53, 54, as between the terminals 56, 57 is a resistance 55 adjustably contacted by an arm 58 through the agency of a reversible motor 59 which is adapted to position the indicator arm 41 previously mentioned.

Assume that the position of the arm 58 is represented by the letter B. The voltage drop across the secondary windings 53, 54 varies directly with the positioning of the core member 51 and consequently proportional to changes in the per cent TA expressed as a ratio between the actual air and the air required for theoretical combustion conditions. The portion of this voltage selected by the contact arm 58 is varied by the balancing motor 59 so that the value of the voltage drop in the resistance 55 between the contact arm 58 and the terminal 56 may be represented by $B \times$ percent TA.

The terminals 47 and 56 are joined by a conductor 60. Joining the contact arms 50 and 58 is a conductor 61 in which is interposed an amplifier and motor control circuit 62. The latter is sensitive to any unbalance voltage in the conductor 61 and is adapted to cause an energization of the motor 59 in one direction or the other and at a controllable speed dependent upon the voltage unbalance in the conductor 61. Such amplifier and motor control circuit 62 and motor 59 may be of the type disclosed and claimed in the copending application of Anthony J. Hornfeck, Serial No. 693,290, filed August 27, 1946, now Patent 2,544,790 granted March 13, 1951.

The network just described is arranged to perform a calculation which may be expressed by:

$$AF \times 1333 = B \times TA$$
$$B = \frac{AF \times 1333}{TA}$$

or $$B. t. u. \text{ input/hr.} = \frac{\text{lb./hr. air} \times 1333}{\text{per cent total air}}$$

When the network is in balance no voltage drop exists in the conductor 61 and the motor 59 is quiescent. The indicator 41 indicates relative to the index 42 the total B. t. u. input per hour to the boiler. If either AF or TA varies during operation of the unit or if the contact arm 50 is manually moved then the network will be unbalanced with a resulting voltage drop in the conductor 61 in direction and magnitude dependent upon the nature of the unbalance. Any unbalance of the system, following a balanced condition, results in the amplifier and motor control 62 energizing the motor 59 in proper direction and speed to so position the contact arm as to return the network to balance. Inasmuch as the indicator 41 is simultaneously positioned by the motor 59 its movement relative to the index 42 will be proportional to the change which caused the unbalance and the reading of 41 relative to 42 under any balanced condition will be a value of total B. t. u. input per hour.

I have indicated that the motor 59 also positions a movable core 63 of an adjustable core transformer having a continuously energized primary winding 64 and a pair of bucking secondary windings 65, 66 connected in series. Across the terminals 67, 68 of the secondary windings 65, 66 I show a resistor 69 having a movable contact arm 70. I may represent the position of the arm 70, along the resistance 69 by B' representing the balance function of this portion of the system.

The voltage drop across the secondary windings 65, 66 varies directly with the positioning of the core member 63 and consequently is proportional to changes in the B. t. u. input to the boiler per hour. The portion of this voltage selected by contact 70 is varied in direct proportion to B' and thus the value of the voltage drop in the resistance 69 between the terminal 67 and the contact arm 70 is therefore representative of the product of B. t. u. input per hour $\times$ B'.

It will now be observed that the lowermost network of Fig. 2 embodies factors representative of those variables useful in interrelating heat input and heat output to arrive at the overall thermal efficiency of the boiler in percentage or other desirable units. This may be expressed as follows:

$$\text{Heat input (I)} = \frac{1333\ AF}{\text{per cent } TA}$$
$$\text{Heat output (O)} = (T_2 - T_1) \times SF$$
$$(T_2 - T_1) \times SF = B' \times I$$
$$B' = \frac{(T_2 - T_1) \times SF}{I}$$
$$= \frac{O}{I}$$

$$\text{Boiler Eff. (per cent)} = \frac{\text{Heat output }(O)}{\text{Heat input }(I)}$$

therefore

Position of B' represents boiler efficiency in percent.

The terminals 34, 67 are joined by a conductor 71. Joining the contact arm 38 with the contact arm 70 is a conductor 72 in which is interposed an amplifier and motor control circuit 73 for regulating the direction and speed of rotation of the motor 74. When the system is in balance no voltage unbalance exists in the conductor 72 and the motor 74 is quiescent. If the network is unbalanced by a variation in $T_1$, $T_2$, SF or I then the motor 74 is caused to rotate in proper direction to position the arm 70 until the value B' balances the changed condition and the system is again in balance. Inasmuch as the arm 70 is positioned in accordance with changes in the boiler efficiency it will be apparent that an indicator arm 75 also positioned by the motor 74 is likewise moved with changes in boiler efficiency and its position relative to an index 76 and to a revoluble chart 77 provides a continuous visual manifestation of boiler efficiency in percentage as continuously solving the mathematical operation of dividing heat output value by heat input value.

Referring now to Fig. 3 I have shown therein a second embodiment of my invention differing from that of Fig. 2 only in the manner of mechanically and/or electrically interrelating the variables to arrive at the desired result wherein I provide a continuous ascertainment of boiler operating efficiency on an overall thermal basis disregarding the source or cause of any heat losses within the unit between the liberation of fuel and the heat output in the form of steam. I have in Fig. 3 utilized the same reference letters and numerals as I have used in Fig. 2 to designate identical elements.

Herein the resistance element $T_1$ whose resistance varies with temperature of the feed water is included directly in a resistance bridge 78 while the resistance element $T_2$ is included in a bridge 79. The bridges 78, 79 are connected subtractively across the terminals 34, 35. Between the terminals 34, 35 is the resistor 33 along which is positioned the contact arm 38 responsive to rate of steam outflow. As in the circuit of Fig. 2 the present circuit performs the operation previously described to evolve an answer in efficiency of the boiler unit which is indicated in percentage or other desirable units by the arm 75 relative to the index 76 and to the revoluble chart 77.

While I have chosen to illustrate and describe certain preferred embodiments of my invention it will be understood that these are by way of example only and are not to be considered as limiting.

What I claim as new and desire to secure by Letters Patent of the United States is:

1. A boiler efficiency meter adapted to manifest the percent overall efficiency of a boiler by continuously calculating the ratio of heat output rate and heat input rate comprising in combination, means measuring the total heat which has been absorbed by the fluid during its passage through the boiler, means measuring the rate of flow of air and gases passing through the boiler and multiplying the rate by the number of heat units theoretically liberated per pound of air consumed, a device continuously analyzing the gases leaving the boiler providing a manifestation in terms of ratio between theoretical combustion and actual combustion conditions, and a calculating system responsive to said means and said device and adapted to provide a continuous manifestation of the ratio between heat output and heat input in terms of overall boiler efficiency, the second means and device so arranged in the calculating system as to divide the said multiplication by the ratio producing a result indicative of heat input.

2. The combination of claim 1 wherein the first means measuring the total heat absorbed by the fluid includes a meter of weight rate of steam outflow, a temperature measuring device for the steam and a temperature measuring device for the feed water.

3. The combination of claim 1 including means between the said first means and the calculating system adapted to compensate for the nonlinear relation between measured steam conditions and B. t. u. content of the steam.

4. The combination of claim 1 wherein the analyzing device continuously ascertains the percentage of free oxygen and/or unburned combustible in the gases leaving the boiler and provides a representation of combustion conditions in terms of total air, as for example, 150% total air representing 50% more air being supplied than is theoretically required for combustion.

5. An efficiency meter for a boiler having feed water supplied thereto comprising in combination, a device for measuring the temperature of the steam generated, a device for measuring the temperature of the feed water supplied, means controlled by said devices for producing an electric potential proportional to the heat difference between the steam and feed water, a meter for measuring the actual air flow through the boiler, a meter for determining the per cent of the actual air to theoretical air, means controlled by said meters for producing an electric potential proportional to the heat input to the boiler, means responsive to the steam flow from said boiler for selecting a portion of said first mentioned electric potential, adjustable means for selecting a portion of said second electric potential, means for connecting said selected portions of said potentials in opposition, means responsive to an unbalance of said selected potential portions for adjusting said adjustable means to restore balance, and indicating means positioned by said last mentioned means.

6. An efficiency meter for a boiler having feed water supplied thereto comprising in combination, means responsive to the temperature of the steam producing an electric potential proportional to the B. t. u. content per lb. of steam delivered, means responsive to the temperature of the feed water for producing an electric potential proportional to the B. t. u. content per lb. of feed water supplied, means connecting said potentials in opposition to provide a potential proportional to the difference between the B. t. u. content of the steam and feed water, means responsive to steam flow for selecting a portion of said last mentioned potential, a meter for measuring the actual air flow through the boiler, a meter for determining the percent of the actual air passing through the boiler to the theoretical air required, means controlled by said meters for producing an electric potential proportional to the B. t. u. input to the boiler, adjustable means for selecting a portion of said last mentioned potential, means for connecting said selected potential portions in opposition, means responsive to an unbalance of said selected potential portions for positioning said adjustable means to restore balance, and indicating means positioned by said last mentioned means.

7. The meter of claim 6 in which each of said first and second mentioned means includes an inductor having a primary winding energized from a source of alternating current, a pair of secondary windings connected in series opposition, and a core member movable relative to said windings in response to changes in temperature.

8. A steam boiler efficiency meter including in combination; a steam flow meter, a temperature measuring device for the steam, a temperature measuring device for the feed water, and a first calculating network responsive to the meter and both devices for continuously representing the heat output of the boiler; an air flow meter for the flue gases, a device determining the ratio of total air supplied the boiler to the air needed for theoretically correct combustion, and a second calculating network responsive to the meter and device for continuously representing the heat input to the boiler; and a third calculating network continuously responsive to the representations of the first and second networks for continuously representing the heat efficiency of the steam boiler.

9. A boiler efficiency meter adapted to visually exhibit the over-all efficiency of a boiler by continuously calculating the ratio of the heat output rate and heat input rate including, a first meter for determining the rate of flow of vapor generated by the boiler, temperature responsive means cooperatively linked with the vapor flow meter for establishing an effect representative of the B. t. u. absorbed by the vapor in the boiler, a second meter for determining the rate of flow of air and products of combustion through the boiler, a third meter for analyzing the gaseous products of combustion and excess air leaving the boiler and calibrated in terms of relation between actual air furnished the combustion process and the air which should be supplied to effect theoretically correct combustion, means responsive to said second and third meters for establishing an effect representative of the B. t. u. liberated in the furnace, and a calculating network responsive to the B. t. u. liberated and B. t. u. absorbed effects continuously obtaining the boiler efficiency therefrom.

PAUL S. DICKEY.

REFERENCES CITED

The following references are of record in the file of this patent:

UNITED STATES PATENTS

| Number | Name | Date |
|---|---|---|
| 2,252,367 | Germer | Aug. 12, 1941 |
| 2,252,369 | Germer | Aug. 12, 1941 |
| 2,293,403 | Razek | Aug. 18, 1942 |
| 2,305,759 | Germer | Dec. 22, 1942 |